United States Patent [19]
Kabanov et al.

[11] 3,917,139
[45] Nov. 4, 1975

[54] APPARATUS FOR CUTTING SHAPES OUT OF GLASS SHEETS

[76] Inventors: Nikolai Pavlovich Kabanov, Naberezhnaya Sheuchenko, 3, korpus 3, kv. 50, Moscow; Vitaly Sergeevich Schukin, Leninsky prospekt, 72, kv. 500, Moscow; Sergei Fedorovich Makhalov, ulitsa Shkolnaya, 5, kv. 10, Bor Gorkovskoi oblasti; Jury Alexeevich Knyazev, ulitsa Shkolnaya, 1, kv. 16, Bor Gorkovskoi oblasti; Dmitry Nikolaevich Savonichev, ulitsa Shkolnaya, 4, kv. 8, Bor Gorkovskoi oblasti; Vladimir Nikolaevich Suvorov, ulitsa Shkolnaya, 2, kv. 6., Bor Gorkovskoi oblasti, all of U.S.S.R.

[22] Filed: Jan. 22, 1975

[21] Appl. No.: 543,040

[52] U.S. Cl. .............................. 225/96.5; 225/103
[51] Int. Cl.² .......................................... B26F 3/00
[58] Field of Search ............... 225/2, 93, 94, 95, 96, 225/96.5, 97, 103

[56] References Cited
UNITED STATES PATENTS

| | | |
|---|---|---|
| 2,052,243 | 8/1936 | Ostermier ............................ 225/2 |
| 2,302,174 | 11/1942 | Boicey et al. ....................... 225/2 |
| 2,711,617 | 6/1955 | Trammell .......................... 225/96.5 |
| 3,532,259 | 10/1970 | Augustin et al. ................. 225/97 X |
| 3,532,260 | 10/1970 | Augustin et al. ............... 225/96.5 X |

Primary Examiner—J. M. Meister
Assistant Examiner—Fred A. Silverberg
Attorney, Agent, or Firm—Robert E. Burns; Emmanuel J. Lobato; Bruce L. Adams

[57] ABSTRACT

In the hitherto known apparatus the pressure member creating a through-going crack along the outline of the shape being cut out is a spring-biased roller.

In the herein disclosed apparatus the roller has been replaced with a spherical body accommodated within a vertical tubular guide adjoining a casing connected with a pressure source. An advantage offered by this structure is accurate copying by the pressure member of the trajectory of the motion of the cutting head creating the line of cutting out. In its turn, this increased accuracy prevents deviation of the crack from the line of cutting out.

3 Claims, 3 Drawing Figures

APPARATUS FOR CUTTING SHAPES OUT OF GLASS SHEETS

The present invention relates to apparatus for cutting required shapes out of sheet glass.

As it is commonly known, following the cutting operation in which a scratch is made in a glass sheet along the outline of the shape to be cut out, there is performed an operation of separation of the outlined shape from the rest of the glass sheet. In the disclosure to follow this last-mentioned operation will be referred to, for the sake of brevity, as the "flash removal operation". It is obviously highly desirable that the scratch made in the surface of the glass sheet in the course of the shape cutting out operation should be transformed into a crack going through the glass sheet, since it would greatly enhance the following flash removal operation.

At present, there are widely known arrangements for making a scratch in the surface of a glass sheet, including a table for accommodation of the glass sheet and a cutting head positioned above this table and adapted to move along a template equidistant from the contour of the shape being cut out.

These known arrangements are devoid of specific means for transforming the scratch into a through-going crack. The latter is obtained simply by increasing considerably the pressure of the cutting head upon the surface of the glass sheet. In such cases the effort of pressing the cutting head to the glass sheet is increased two to four times. However, in this abovespecified manner it is not possible to obtain a through crack with the sheet thickness in excess of 4 mm. With a greater sheet glass thickness the required pressure is so great that it leads to breaking of the glass outside the crack. In practice, in such cases there is encountered crumbling of the surface of the glass.

Besides, the increased load applied to the glass cutting tool curtails its service life.

There are also relatively widely known arrangements for making a scratch in the surface of a glass sheet, provided with means for simultaneously making a through-going crack along the line of cutting. A characteristic feature of these arrangements is that the outline of the glass-supporting surface of the table coincides with the outline of the glass shape being cut out, there being mounted above the support table adjacent to the perimeter thereof several pressing elements in the form of horizontal strips and the like, or else a single pressing element in the form of a closed frame equidistant from the contour of the shape being cut out.

A through crack is obtained in the course of making the scratch by acting with the abovementioned pressing elements upon the margins of the glass sheet, the elements being driven downwardly by associated drive means, thus bending down the marginal portion of the sheet with a required effort.

A major disadvantage of these last-described arrangements arises from the bending down of the marginal portion of the glass sheet being performed simultaneously along the entire contour.

As a result, with the glass being poorly annealed the formation of the crack is liable to precede the making of the scratch, with the crack deviating, as a rule, from the required contour of the shape being cut out. Quite obviously, this means that the required contour of the shape being cut out is distorted, and the glass sheet is to be rejected.

As widely known are arrangements for the same purpose wherein the means ensuring transformation of the scratch into a through-going crack includes a spring-urged roller mounted on the cutting head and moving jointly therewith. As the cutting head moves and makes the scratch, the roller presses upon the glass sheet, whereby a through crack is made along the line of scratching. However, practical experience shows that the abovementioned pressure roller induces oscillation of the cutting head, whereby the scratching line deviates from the required outline. This drawback becomes particularly pronounced when the cutting head moves along the corner portions of the template, with the roller partly skidding on the glass.

Moreover, on account of the cutting head and the pressure roller moving jointly, in operation of these arrangements there are also encountered cases when the crack formation precedes forming of the scratch, with all the unwanted consequences which have been already discussed hereinabove.

It is, therefore, the main object of the present invention to improve the means for forming a through-going crack along the line of cutting out in an apparatus for cutting shapes out of glass sheets with formation of a through-going crack along the cutting line.

Among the other objects of the present invention are: reducing considerably the hazard of crumbling and breaking the glass sheets and thus reducing the percentage of waste associated with the cutting-out operation; reducing the cutting effort and, consequently, reducing the load of the glass cutting tool and prolonging its life.

Other objects and advantages of the present invention will become apparent from the description to follow.

These objects are attained in an apparatus for cutting shapes out of glass sheets with formation of a through-going crack along the line of cutting out, comprising a table for accommodation of a glass sheet, a cutting head for making a scratch in the surface of this sheet along the line of cutting out and means for formation of a through-going crack along the line of cutting out, including a member adapted to press upon the glass sheet along the line of cutting out with an effort sufficient for formation of the through-going crack, in which apparatus, in accordance with the present invention, said member includes a spherical body mounted in a vertical tubular guide adjoining a casing of which the internal space communicates with a source of pressure.

The herein disclosed structure provides for varying the character of the rolling of the spherical pressure member in either direction. This, in its turn, provides for following accurately the path and the direction of the travel of the cutting head at any moment, including that of moving along the corner portions of the shape being cut out, as well as for compensation for unevenness of the surface of the glass, owing to the spherical pressure member being vertically movable.

It is advisable that the means for formation of a through-going crack should be mounted on a carriage arranged somewhat behind the cutting head and movable in synchronism therewith.

In this way there is prevented the eventuality of the cutting head being oscillated by the pressure member and, therefore, there is precluded the hazard of the crack formation preceding that of the scratch.

According to one embodiment of the present invention, the synchronism of the travel of the cutting head and that of the carriage with the means for formation of a through-going crack is attained by their motion being effected by means of a single endless chain equidistant from the contour of the shape being cut out.

Given hereinbelow is a detailed description of an embodiment of the present invention, with reference being had to the accompanying drawings, wherein.

Figure 1:
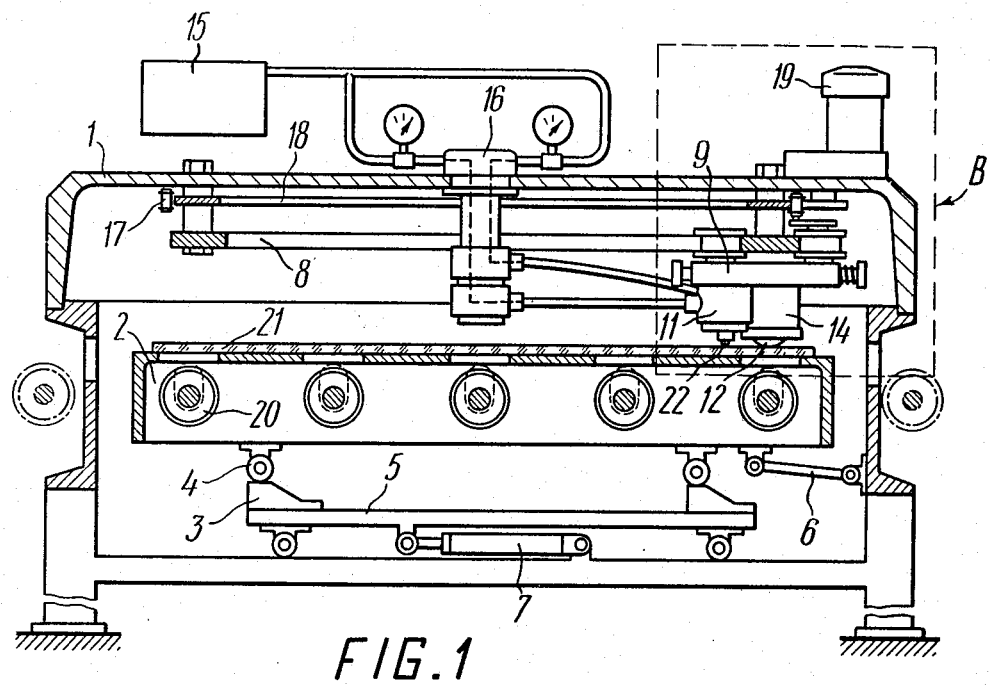
FIG. 1 is a longitudinally sectional view of an apparatus for cutting shapes out of glass sheets in accordance with the invention.

Referring now in particular to the appended drawings, the apparatus includes a frame 1 (FIGS. 1 and 2) on which there is mounted a vertically reciprocable table 2 adapted to accommodate thereon a glass sheet from which a required shape is to be cut.

Vertical reciprocation of the table 2 is possible owing to the table 2 being mounted on wedge-type supports 3 (FIG. 1) by means of caster wheels 4. The wedge-type supports 3, in their turn, are mounted on a horizontally reciprocable platform 5. The table 2 is retained against longitudinal displacement by means of a rod 6 having one its end pivotally connected with the table 2 and the other end pivotally connected with the frame 1. Reciprocation of the platform 5 is effected by means of an air cylinder 7, of which one end is pivotally connected with the frame 1, while the other end is connected with said platform 5. Reciprocation of the platform 5 in the longitudinal direction effects, respectively, raising and lowering of the table 2. The same frame 1 supports a template 8 (FIGS. 1 to 3) overlying the table 2, the template being of a shape equidistant from the contour of the shape to be cut out of a sheet glass.

Figure 2:
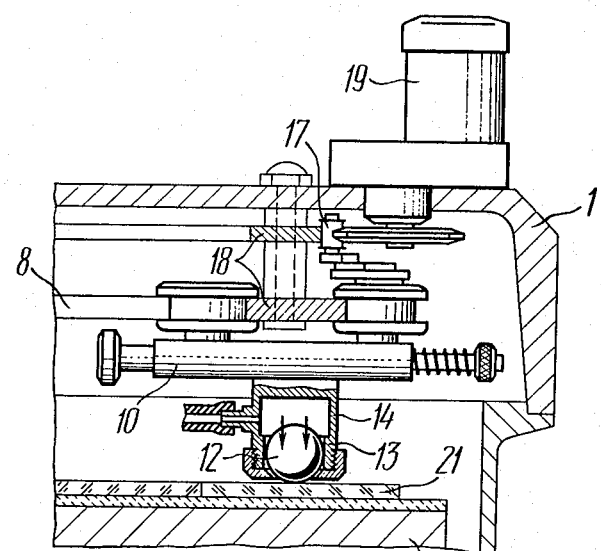
FIG. 2 is an enlarged view of detail B, shown in FIG. 1.
Figure 3:
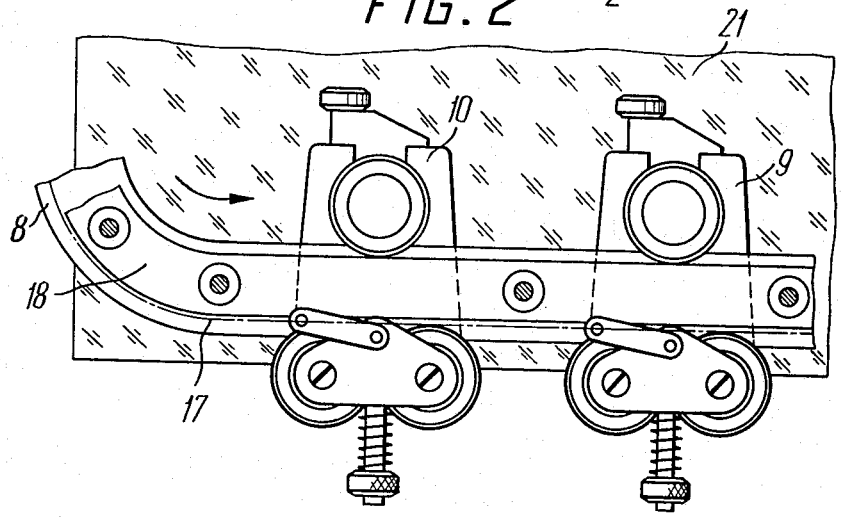
FIG. 3 is a plan view of the assembly by means of which the cutting head and the means for formation of a through-going crack are mounted on the template.

The template 8 has successively mounted thereon a pair of carriages 9 and 10 carrying, respectively, a cutting head 11 (FIG. 1) for making a scratch outlining the contour of the shape to be cut and a means for formation of a through-going crack along the line of scratching. This means includes a pressure-applying member in the form of a sphere 12 (FIGS. 1 and 2). The latter is mounted in a vertical tubular guide 13 (FIG. 2) made integral with a casing 14 (FIGS. 1 and 2). The internal space of the latter is connected to a source 15 (FIG. 1) of compressed air through an air distributor 16. The two carriages 9 and 10 are driven by a driving chain 17 (FIGS. 1 to 3) following in its motion an additional template 18.

The chain 17 is driven from a drive motor 19 (FIGS. 1 and 2). The herein disclosed driving arrangement of the two carriages ensures that they move in synchronism along the template 8 one behind the other. However, for the purposes of the present invention it is possible to use any other suitable arrangement for driving the two carriages, provided this arrangement ensures that the two carriages are moved in synchronism with a permanent spacing therebetween.

The arrangement of the cutting head 11 and of the means for formation of a through crack on the respective different carriages 9 and 10 is not absolutely imperative for achievement of the main purpose of the present invention, but is, however, highly desirably, since with this arrangement oscillation of the cutting head 11 is precluded.

The herein disclosed apparatus operates as follows.

In an initial position the table 2 is at its downmost, whereby its top plane is beneath the level of the driven feed rollers 20 which are operated to feed a glass sheet onto the table 2. The driving arrangement of the rollers 20 is not described here in detail, since both the driving arrangement of the feed rollers and the rollers themselves are widely known per se in apparatus similar to the one described and have been repeatedly disclosed in various publications.

The rollers 20 feed a sheet 21 of glass to overlie the table 2. Then the air cylinder 7 is operated to displace the platform 5 in a direction corresponding to the caster wheels 4 rolling up the slopes of the wedge-type supports 3, whereby the table 2 is raised into its topmost position. With the table 2 being raised the glass sheet 21 is lifted thereby off the feed rollers 20 and becomes supported by the table 2. As the latter reaches its topmost position the glass sheet 21 is pressed against the cutting tool 22 (FIG. 1) of the cutting head 11 and against the spherical pressure member 8 of the means for formation of a through crack. Then the drive motor 19 (FIGS. 1 and 2) is energized to drive the chain 17.

Correspondingly, the carriages 9 and 10 start moving along the template 8, the carriages carrying, respectively, the cutting head 11 and the crack formation means. In this way there is performed the operation of cutting out a shape with formation of a through crack along the line of cutting out. The two carriages 9 and 10 being driven by the same chain, there is ensured synchronous motion of the two carriages and, consequently, of the cutting head 11 and of the crack formation means.

Owing to this synchronism of the motion of the two carriages and also owing to the carriage 10 supporting the crack formation means somewhat lagging behind the carriage 9, there is practically precluded a situation where the crack overruns or precedes the scratch with resulting deviation from the prescribed path defined by the contour of the shape to be cut out.

The operation of cutting out the shape is terminated with the cutting head 11 halting in the position of starting the cutting out operation.

Thereafter the air cylinder is operated once again to displace the platform 5 in the direction corresponding to the caster wheels 4 of the table 2 rolling down the slopes of the wedge-type supports 3, whereby the table 2 is lowered into its lowermost position beneath the feed rollers. Thus, the sheet 21 is now supported by the rollers 20 which deliver it away from the table 2 for subsequent handling.

What is claimed is:

1. An apparatus for cutting shapes out of glass sheets with formation of a through-going crack along the line of cutting out, comprising: a frame; a table, for accommodation of a glass sheet thereon, mounted on said frame; a template likewise mounted on this frame, equidistant from the contour of a shape to be cut out of the glass sheet; a cutting head for making a scratch in the glass sheet along said contour, said head being supported by said template for motion therealong; means for making a through-going crack in the glass sheet along said contour, movable along said template in synchronism with said cutting head and comprising a tubular guideway and a spherically shaped pressure member received in said guideway to press against the glass sheet; a casing having an internal space, said internal space communicating with said tubular guideway; and a source of pressurized fluid communicating with said internal space of said casing to press said member against said glass sheet.

2. An apparatus as claimed in claim 1, including a carriage supporting said crack making means and situated somewhat behind said cutting head for the moving of the crack making means in synchronism therewith.

3. An apparatus as claimed in claim 1, including means for effecting motion of said cutting head and of said crack making means, comprising an endless chain equidistant from said contour.

* * * * *